United States Patent [19]
Stewart

[11] 3,821,888
[45] July 2, 1974

[54] PRE-LOADING APPARATUS
[75] Inventor: Jack D. Stewart, Doylestown, Pa.
[73] Assignee: Princeton Metal Systems Corporation, Montgomery Township, N.J.
[22] Filed: May 14, 1973
[21] Appl. No.: 360,115

[52] U.S. Cl............................ 72/60, 72/270, 72/272
[51] Int. Cl............................................. B21c 27/00
[58] Field of Search....... 72/60, 253, 257, 270, 272, 72/273, 424

[56] References Cited
UNITED STATES PATENTS
| | | | |
|---|---|---|---|
| 3,566,641 | 3/1971 | Sauve | 72/60 |
| 3,618,351 | 11/1971 | Thompson | 72/270 |
| 3,702,555 | 11/1972 | Larker et al. | 72/60 |
| 3,751,958 | 8/1973 | Nilsson et al. | 72/60 |

Primary Examiner—Richard J. Herbst
Attorney, Agent, or Firm—Popper, Bain, Bobis, Gilfillan & Rhodes

[57] ABSTRACT

Pre-loading apparatus for pre-loading: (i) a billet to be hydrostatically extruded, (ii) a quantity of hydrostatic extrusion medium, (iii) an extrusion die through which the billet is to be hydrostatically extruded, (iv) an extrusion chamber seal, and (v) a body of consumable material, such items to be loaded into the extrusion chamber of a hydrostatic extrusion apparatus, comprising receiving means for receiving: (i) the billet, (ii) the quantity of hydrostatic extrusion medium, (iii) the extrusion chamber seal spaced apart from one end of the billet and separated therefrom by a portion of the hydrostatic extrusion medium; (iv) the extrusion die spaced apart from the other end of the billet, and (v) the body of the consumable sealing material residing between the extrusion die and the other end of the billet and providing a temporary seal for preventing escape of the hydrostatic extrusion medium through the extrusion die during pre-loading of the items; aligning means provided on the receiving means and for engaging predetermined portions of the extrusion apparatus to align the pre-loaded items with the extrusion chamber for the loading of the pre-loaded items into the extrusion chamber; and means for supporting the receiving means during the pre-loading of the items into the receiving means.

5 Claims, 5 Drawing Figures

PRE-LOADING APPARATUS

BACKGROUND OF THE INVENTION

As is known to those skilled in the discrete billet hydrostatic extrusion art, the process of loading a discrete billet into a hydrostatic extrusion apparatus for hydrostatic extrusion is a cumbersome process including several separate and distinct steps. For example, first, a die must be loaded into the hydrostatic extrusion apparatus; second, a method of sealing the die in the hydrostatic extrusion machine must be provided; third, fluid for hydrostatic extrusion must be introduced into the hydrostatic extrusion apparatus; fourth, a billet to be extruded must be inserted into the machine; fifth, a method of eliminating air from the extrusion chamber must be effected; and sixth, a method of sealing the extrusion chamber for extrusion must be accomplished.

As is further known to those skilled in the hydrostatic extrusion art, in the prior art the extrusion die is usually at least semi-permanently affixed to the extrusion chamber and for change of extrusion shape or the change of a billet to be extruded, such die must typically be removed from the machine for each change and replaced with a die appropriate to the next extrusion to be accomplished. The problem presented by such die arrangement is that the valuable time of the hydrostatic extrusion apparatus is consumed in non-productive or non-extrusion work by time required to replace or change the extrusion die.

SUMMARY

In accordance with the pre-loading apparatus of the present invention, the above-noted steps, or their equivalents, may be accomplished at a pre-loading station separate and apart from the machine so as not to encumber the hydrostatic extrusion apparatus with the time required for accomplishing the separate and distinct steps noted above.

Further, and in accordance with the present invention, the extrusion die to be used is selected and loaded in cooperation with the billet to be extruded at the pre-loading station distant from the extrusion apparatus and hence the extrusion time of the hydrostatic extrusion apparatus is not wastefully consumed by time spent changing the die in the hydrostatic extrusion apparatus.

Still further, and in accordance with the teaching of the pre-loading apparatus of the present invention, wherein the billet to be extruded, the hydrostatic extrusion fluid, the extrusion die, and the main chamber seal for the breech end of the extrusion chamber are all pre-loaded at a pre-loading station distant from the machine, such improvement in the art also facilitates or gives rise to fully automatic or automated loading of the hydrostatic extrusion apparatus in a manner similar to that currently employed by automatic tool changing tape controlled milling machines and also the Navy automatic three inch 50 rifles.

DESCRIPTION OF THE INVENTION

GENERAL DESCRIPTION

Figure 1:
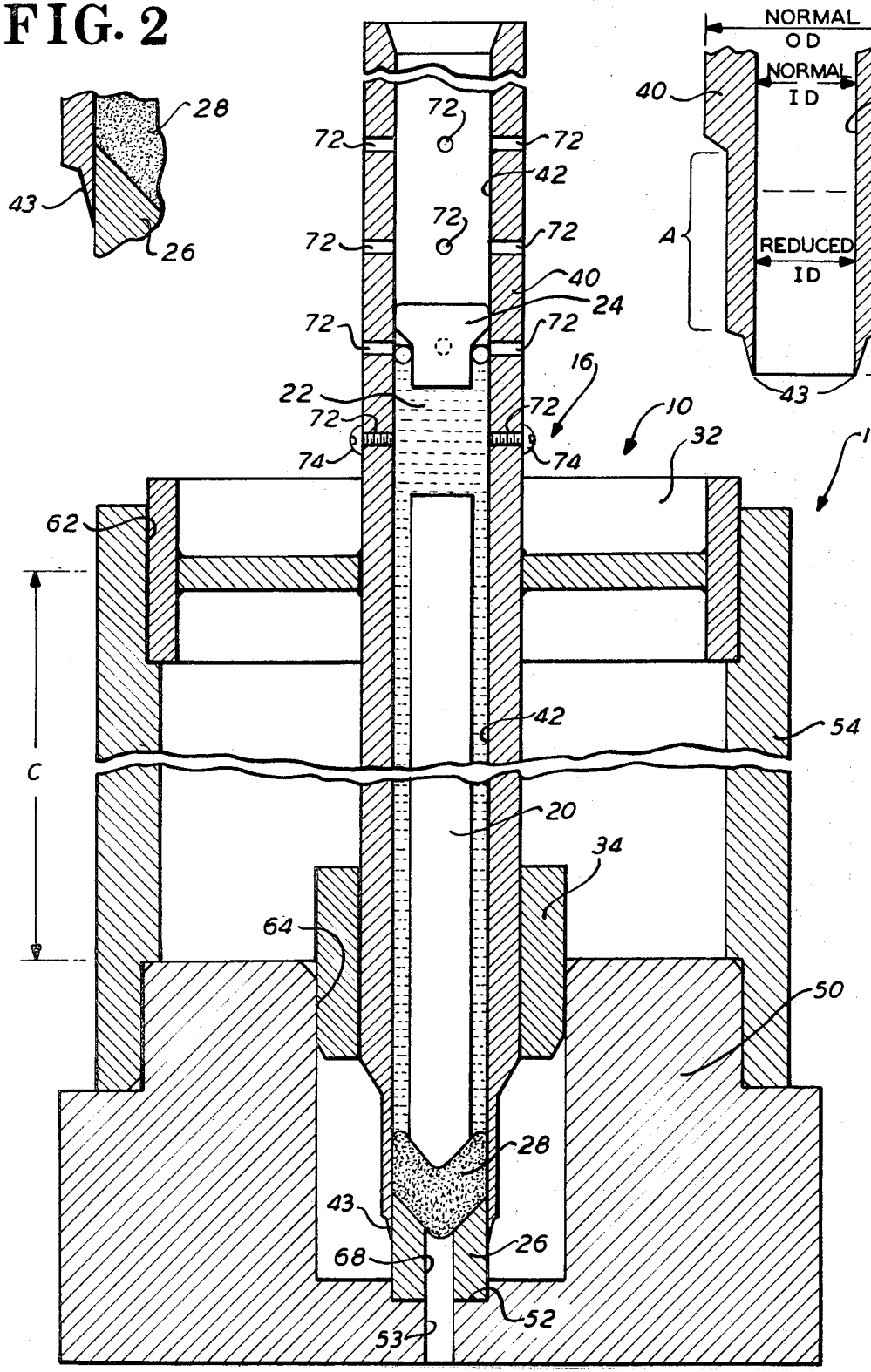
FIG. 1 is a diagrammatic illustration of pre-loading apparatus embodying the present invention.
Figure 2:
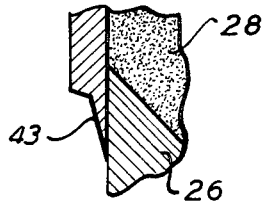
FIG. 2 is an enlarged fragmentary view of a portion of FIG. 1.
Figure 4:
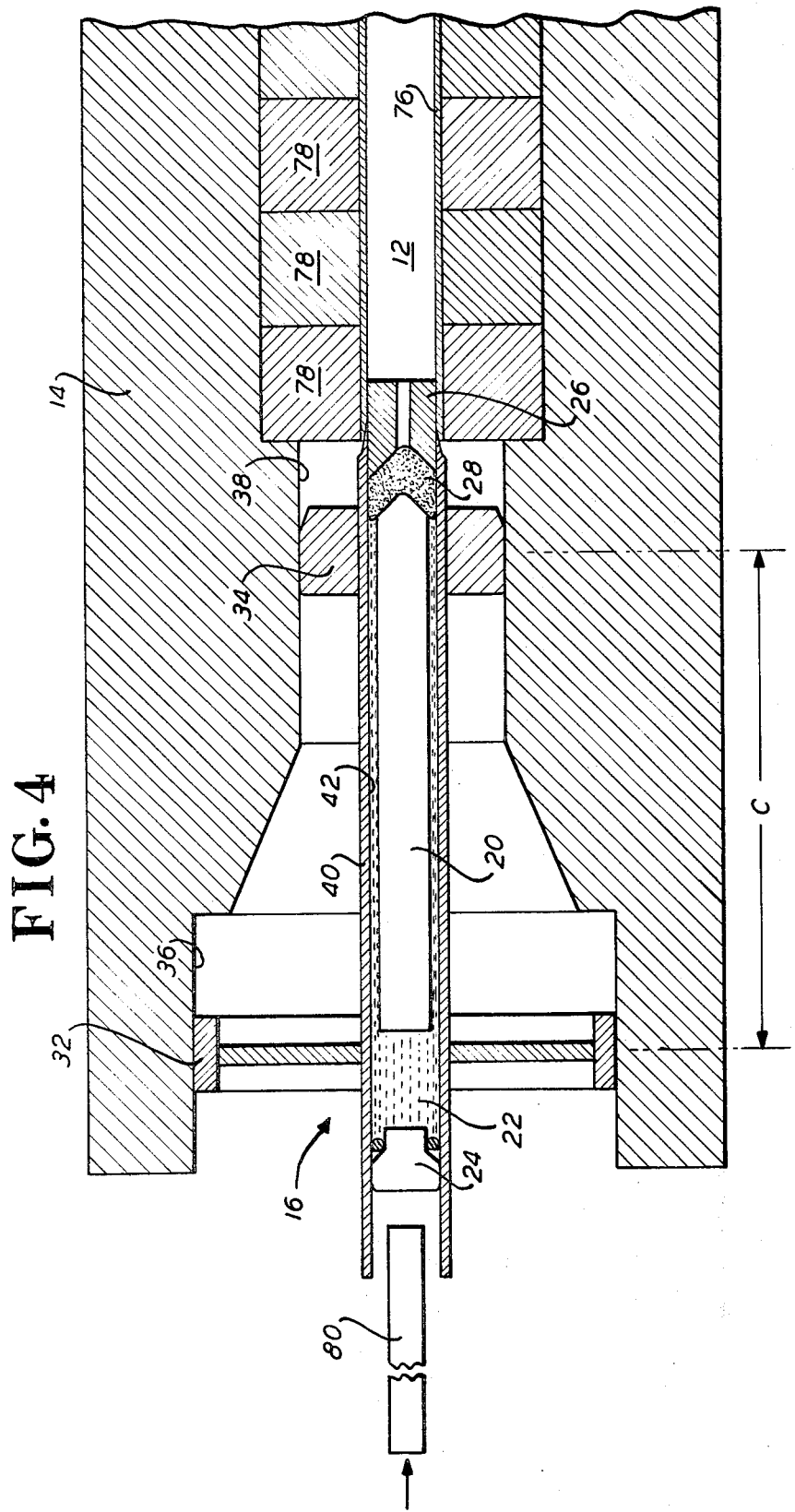
FIG. 4 is a diagrammatic illustration of the manner in which the pre-loading apparatus of the present invention may be loaded into a hydrostatic extrusion apparatus.

Referring generally to FIGS. 1 and 4, there are shown pre-loading apparatus indicated by general numerical designation 10 for pre-loading a plurality of items to be loaded into the extrusion chamber 12 (FIG. 4) of a hydrostatic extrusion apparatus 14. The pre-loading apparatus 10 includes receiving means, indicated by general numerical designation 16, and means, indicated by general numerical designation 18, for supporting the receiving means 10 during the pre-loading of the items into the receiving means.

The receiving means 10 is for receiving: (i) a billet 20 to be hydrostatically extruded, (ii) a quantity of hydrostatic extrusion medium 22, (iii) an extrusion chamber seal 24 spaced apart from the butt end of the billet and separated therefrom by a portion of the hydrostatic extrusion medium 22, (iv) an extrusion die 26 spaced apart from the head end of the billet 20, and (v) a body of consumable sealing material 28 residing between the extrusion die 26 and the head end of the billet 20 and for providing a temporary seal for preventing escape of the hydrostatic extrusion medium 22 through the extrusion die during pre-loading of the items received by the receiving means 16.

The receiving means 16 are provided with first aligning means 32 and second aligning means 34 for respectively engaging surfaces 36 and 38 formed internally at the breech end of the extrusion apparatus 14 (FIG. 4). The aligning means 32 and 34 are for aligning the billet 20, and other items pre-loaded into the receiving means 16, with the extrusion chamber 12 of the hydrostatic extrusion apparatus 14.

SPECIFIC DESCRIPTION

Figure 3:
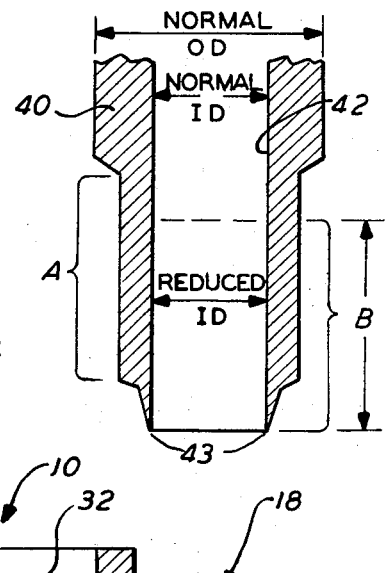
FIG. 3 is an enlarged view of a portion of the pre-loading apparatus of the present invention.

Referring now specifically to the pre-loading apparatus of the present invention, and referring particularly to the receiving means 16, such receiving means includes a generally cylindrical member 40 having a generally circular longitudinally extending bore 42 formed therein. As may be best seen in FIG. 3, the generally cylindrical member 42 has a normal OD and a normal ID providing the bore 42. The OD of the outer end portion of the lower end of the generally cylindrical member 40 is of a reduced OD along the length indicated by the bracket A in FIG. 3. Further, the outer end portion of the lower end of the generally cylindrical member 40 is of still further reduced diameter and terminates in an annular knife-blade portion 43, the cross section of which comes substantially to a point as shown in FIG. 3. Further, it will be noted from FIG. 3, that length of the end portion B of the generally cylindrical member 40 is of reduced ID and it will be understood that such reduced ID is slightly smaller than the OD of the extrusion die 26.

As may be best seen in FIG. 1, the first aligning means 32 extends radially outwardly from the generally cylindrical member 40 and may be of ribbed construction as shown in cross-section, and may be mechanically associated with the generally cylindrical member 40 by being welded thereto or made integrally therewith. Similarly, the second aligning means 34 also extend radially outwardly from the generally cylindrical member 40 and may also be mechanically associated with the generally cylindrical member 40 by being welded thereto or made integrally therewith.

Referring now specifically to the support means 18, and as may be best seen in FIG. 1, the support means 18 includes a base member or bottom 50 having a counterbore 52 formed generally centrally thereof. The support means 18 further includes a vertically upwardly extending portion 54 which may be, for example, of generally annular configuration, or may be of a frame-like configuration including a plurality of vertically disposed members with mechanically associated cross members. The upper portion 54 and the base or bottom portion 50 of the support means 18 are provided, respectively, with support surfaces 62 and 64 which are spaced apart a distance C which is equal to the distance C shown in FIG. 4 which is the distance between the first and second aligning means 32 and 34 when positioned in the breech end of the hydrostatic extrusion apparatus 14 of FIG. 4. The support surfaces 62 and 64 are of generally complementary configuration to the outer surfaces or configuration of the first and second aligning means 32 and 34, and are for receiving the first and second aligning means to thereby vertically support the generally cylindrical member 40 in the manner shown in FIG. 1.

It will be further noted that the leading edges of the outer surfaces of the first and second aligning means are beveled inwardly to facilitate the insertion of the first and second aligning means into engagement with the support surfaces 62 and 64 of the support means 18, as shown in FIG. 1, and to facilitate the insertion and engagement of the first and second aligning means with the internally formed surfaces 36 and 38 of the breech portion of the hydrostatic extrusion apparatus 14 of FIG. 4.

OPERATION

Referring now to FIG. 1, it will be assumed that the receiving means 16 has not been inserted into the support means 18, and the pre-loading operation may begin with the insertion of the extrusion die 26 into the counterbore 52 formed in the bottom or base portion 50 of the support means with the bottom portion of the extrusion die being received within the counterbore and with the upper portion of the extrusion die extending upwardly out of the counterbore. The receiving means 16 may then be inserted into the support means 18 with the portion or length B (FIG. 3) of the end of the generally cylindrical member 40 expanding slightly and sliding over and closely accommodating and receiving at least the upper portion of the extrusion die 26 extending upwardly out of the counterbore 52 as shown at the bottom portion of FIG. 1. Since, as noted above, the end portion B of reduced ID of the generally longitudinally extending member is of slightly smaller diameter than the OD of the extrusion die 26, the extrusion die will be closely mechanically engaged by the lower portion B sufficiently tightly that upon the removal of the receiving means 16 from the support means 18 the lower portion B of the generally longitudinally extending member 40 will mechanically retain the extrusion die 26 for mechanical association with the pre-loading means 16 for the loading of the items received within the generally longitudinally extending member 42 into the extrusion chamber 12 of the hydrostatic extrusion apparatus 14 of FIG. 4. The body of consumable material 28, which may be for example, a suitable plastic or beeswax, is then placed within the bore 42 and moved downwardly, by suitable ram, to plug or fill the bore 68 of the extrusion die 26 to provide a temporary seal thereof for preventing escape of the extrusion fluid through the extrusion die upon the extrusion fluid being pre-loaded into the bore 42 prior to the pre-loading of the billet 20. A quantity of hydrostatic extrusion fluid, such as for example, a suitable oil, is then pre-loaded into the bore 42 to fill the bore to a level above the closed bleed holes 72 shown in the upper portion of FIG. 1 and taught in detail below. Then, the billet 20 is pre-loaded into the bore 42 with the head end of the billet engaging the body of consumable material 48 and being, advantageously, pressed into engagement therewith by a suitable ram inserted into the bore 42 as shown in FIG. 1 to eliminate any trapped air; the hydrostatic extrusion fluid surrounding the sides and butt end of the billet. An additional quantity of hydrostatic extrusion fluid is then poured into the bore 42 to assure there will be sufficient hydrostatic extrusion fluid between the butt end of the billet and the extrusion chamber seal 24 to be pre-loaded into the bore 42 as taught above.

As shown in the upper portion of FIG. 1, the upper portion of the longitudinally extending member 40 is provided with a plurality of longitudinally disposed apertures 72 for providing vent or bleed holes for the hydrostatic extrusion fluid 22. The apertures 72 are for being selectively covered or plugged, such as for example, by screws 74 as shown in FIG. 1, in accordance with the specific length of the billet 20 pre-loaded into the bore 42 so as to provide a predetermined amount of hydrostatic fluid in the bore 42 in accordance with the length of the pre-loaded billet 20.

The extrusion chamber seal 24 is then inserted or preloaded into the bore 42, such as for example by suitable ram, with the extrusion chamber seal 24 being pushed downwardly thereby displacing any excess hydrostatic extrusion fluid 22, and any remaining air, which will be vented or bled out of all of the apertures 72 residing above the apertures 72 which are plugged or covered until the extrusion chamber seal 24 comes to rest substantially opposite the apertures 72 formed immediately above the plugged or covered apertures 72.

Figure 5:
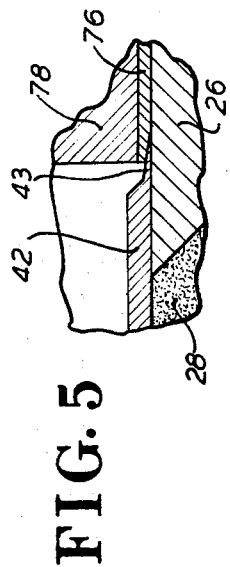
FIG. 5 is an enlarged fragmentary view of a portion of FIG. 4.

Upon the generally cylindrical member 42 having the above-noted items received within the longitudinally extending bore 42, and with the lower end portion B mechanically retaining the extrusion die 26, the receiving means 16 are removed from the support means 18 and are inserted or placed within the breech portion of the extrusion apparatus 14 of FIG. 4, with the first and second aligning means 32 and 34 engaging the predetermined surfaces 36 and 38 of the extrusion apparatus to align the longitudinally extending bore 42 with extrusion chamber 12. (The base 50 of the support means may be provided with a vent hole, or anti-vacuum hole 53 to prevent the forming of a vacuum upon the removal of the receiving means 16 from the support means 18.) Referring particularly to the extrusion apparatus 14 of FIG. 4, it will be understood by those skilled in the art that the extrusion chamber 12 is provided by a liner 76 which provides a fluid tight seal, in combination with other seals ofttimes, for a plurality of longitudinally disposed segmented blocks 78 which provide radial support for the extrusion chamber 12 during the hydrostatic extrusion of the billet 20 in the manner known to those skilled in the hydrostatic extrusion art. As may be best seen in FIG. 5, upon the insertion of the receiving means 16 into the hydrostatic extrusion apparatus 14, the annular knife-blade portion of the end of the generally cylindrical member is closely received within the opening of the extrusion chamber and closely engages the opening of the extrusion chamber to form a temporary seal between the longitudinally extending bore 42 and the extrusion chamber 12 to prevent the escape of the extrusion fluid 22 upon the items received within the longitudinally extending bore 42 being pushed into the extrusion chamber, such as for example, by the ram 80 shown in FIG. 4. With the receiving means 16, and the items received within the longitudinally extending bore 42, being disposed in the breech end of the extrusion apparatus 14 as shown in FIG. 4, the ram 80 may be inserted into the rear end portion of the longitudinally extending member 44 to push the extrusion die 26, body of consumable material 28, billet 20, hydrostatic extrusion fluid 22, and the extrusion chamber seal 24 into the extrusion chamber 12 at predetermined positions therein for the hydrostatic extrusion of the billet 20. The ram 80 may then be withdrawn, and the receiving means 16 may be withdrawn from the breech end of the extrusion apparatus 14 and the breech end of the extrusion apparatus may then be locked by its breechblock or locking mechanism thereby preparing the extrusion apparatus 14 for the hydrostatic extrusion of the billet 20.

It will be understood by those skilled in the art that many variations and modifications may be made in the pre-loading apparatus of the present invention without departing from the spirit and scope thereof.

I claim:

1. Pre-loading apparatus for pre-loading: (i) a billet to be hydrostatically extruded, (ii) a quantity of hydrostatic extrusion medium, (iii) an extrusion die through which the billet is to be hydrostatically extruded, (iv) an extrusion chamber seal, and (v) a body of consumable material, such items to be loaded into the extrusion chamber of a hydrostatic extrusion apparatus, comprising:

receiving means for receiving: (i) said billet, (ii) said quantity of hydrostatic extrusion medium, (iii) said extrusion chamber seal spaced apart from one end of the billet and separated therefrom by a portion of said hydrostatic extrusion medium; (iv) said extrusion die spaced apart from the other end of said billet, and (v) said body of consumable sealing material residing between said extrusion die and said other end of said billet and providing a temporary seal for preventing escape of said hydrostatic extrusion medium through said extrusion die during preloading of said items;

aligning means provided on said receiving means and for engaging predetermined portions of said extrusion apparatus to align said pre-loaded items with said extrusion chamber for the loading of said pre-loaded items into said extrusion chamber; and means for supporting said receiving means during the preloading of said items into said receiving means.

2. Pre-loading apparatus for pre-loading: (i) a billet to be hydrostatically extruded, (ii) a quantity of hydrostatic extrusion medium, (iii) an extrusion die through which the billet is to be hydrostatically extruded, (iv) an extrusion chamber seal, (v) and a body of consumable material, such items to be loaded into the hydrostatic extrusion chamber of a hydrostatic extrusion apparatus, comprising:

receiving means having a longitudinally extending bore formed therein for receiving: (i) said billet, (ii) said quantity of hydrostatic extrusion medium, (iii) said extrusion chamber seal spaced apart from one end of the billet and separated therefrom by a portion of said hydrostatic extrusion medium, (iv) said extrusion die spaced apart from the other end of said billet, and (v) said body of consumable sealing material residing between said extrusion die and said other end of said billet and providing a temporary seal for preventing escape of said extrusion medium through said extrusion die during preloading of said items and said body of consumable material for being extruded through said extrusion die without interfering with the subsequent hydrostatic extrusion of said billet through said extrusion die; and means for supporting said receiving means during the preloading of said items into said receiving means.

3. Pre-loading apparatus for pre-loading: (i) a billet to be hydrostatically extruded, (ii) a quantity of hydrostatic extrusion medium, (iii) an extrusion die through which the billet is to be hydrostatically extruded, (iv) an extrusion chamber seal, and (v) a body of consumable material, such items to be loaded into the extrusion chamber of a hydrostatic extrusion apparatus, comprising:

a generally cylindrical member having a generally circular longitudinally extending bore formed therein for receiving: (i) said billet, (ii) said hydrostatic extrusion medium surrounding at least the sides and one end of said billet, (iii) said extrusion chamber seal spaced apart from one end of said billet and separated therefrom by a portion of said hydrostatic extrusion fluid, (iv) said extrusion die spaced apart from the other end of said billet and separated therefrom, and (v) said body of consumable sealing material residing between said extrusion die and said other end of said billet and providing a temporary seal for preventing escape of said extrusion fluid through said extrusion die during the pre-loading of said items; and first aligning means provided on said generally cylindrical member;

second aligning means provided on said generally cylindrical member and spaced from said first aligning means;

said first and second aligning means for engaging predetermined portions of said extrusion apparatus to align said pre-loaded items and said extrusion chamber; and means for receiving and vertically supporting said generally cylindrical member during the pre-loading of said items and said generally cylindrical member.

4. Pre-loading apparatus for pre-loading: (i) a billet to be hydrostatically extruded, (ii) a quantity of hydrostatic extrusion medium, (iii) an extrusion die through which the billet is to be hydrostatically extruded, (iv) an extrusion chamber seal, and (v) a body of consumable material, such items to be loaded into the extrusion chamber of a hydrostatic extrusion apparatus, comprising:

a generally cylindrical member having a generally circular longitudinally extending bore formed therein, said generally cylindrical member having an OD and an ID providing said bore, the OD of the outer end portion of one end of said generally cylindrical member being of reduced OD and the end of said reduced OD portion being of still further reduced diameter and terminating in an annular knife-blade portion the cross-section of which comes substantially to a point, and the ID of a predetermined portion of said one end of said generally cylindrical member being of reduced diameter and being slightly smaller than the OD of said extrusion die;

first aligning means provided on said generally cylindrical member;

second aligning means provided on said generally cylindrical member and spaced a predetermined distance therealong from said first aligning means;

said first and second aligning means for engaging predetermined portions of said extrusion apparatus to align said longitudinally extending bore with said extrusion chamber;

support means having support surfaces formed therein and spaced apart said predetermined distance and being generally complementary in configuration to the outer configuration of said first and second aligning means and for receiving said first and second aligning means and for vertically supporting said generally cylindrical member, said support means provided with a bottom portion having a counterbore formed generally centrally thereof;

said counterbore for receiving the bottom portion of said extrusion die with the upper portion of said extrusion die extending upwardly out of said counterbore, and upon said generally cylindrical member being received within and vertically supported by said support means as said, said predetermined one end portion of said generally cylindrical member of reduced ID for closely receiving at least the upper portion of said extrusion die extending out of said counterbore, and upon said generally cylindrical member being vertically supported by said support means, said longitudinally extending bore for receiving: (i) a body of consumable sealing material for providing a temporary seal for preventing the escape of extrusion fluid through said extrusion die, (ii) said billet with the head end thereof placed in engagement with said consumable material, (iii) said hydrostatic extrusion medium surrounding at least the sides and butt end of said billet, (iv) said extrusion chamber seal spaced apart from the butt end of said billet and spaced therefrom by a portion of said hydrostatic extrusion fluid; and upon said generally cylindrical member having said items received within said longitudinally extending bore being removed from said support means and being placed within said extrusion apparatus with said first and second aligning means engaging said predetermined portions of said extrusion apparatus to align said longitudinally extending bore with said extrusion chamber, said longitudinally extending bore for receiving a ram for pushing said (i) extrusion die, (ii) said consumable sealing material, (iii) said billet, (iv) said extrusion fluid, and (v) said extrusion chamber seal into said extrusion chamber for the hydrostatic extrusion of said billet; and upon said generally cylindrical member having said items received within said longitudinally extending bore being inserted into said extrusion apparatus, said annular knife-blade portion of said generally cylindrical member being received within the opening of said extrusion chamber and closely engaging the opening of said extrusion chamber to form a seal between said longitudinally extending bore and said extrusion chamber to prevent the escape of said extrusion fluid upon said items received within said longitudinally extending bore being pushed into said extrusion chamber.

5. Apparatus according to claim 4 wherein the other end portion of said generally cylindrical member has a plurality of apertures formed therein spaced apart longitudinally along the length of said other end of said generally cylindrical member, said apertures providing vent holes for said hydrostatic extrusion fluid upon said hydrostatic extrusion fluid being received within said generally cylindrical member, and said apertures for being selectively covered in accordance with the length of said billet so as to vent off excess hydrostatic extrusion fluid and provide a predetermined amount of hydrostatic fluid in said generally cylindrical member and between the butt end of said billet and said extrusion chamber seal.

* * * * *